(12) United States Patent
Berkabile

(10) Patent No.: US 8,181,984 B1
(45) Date of Patent: May 22, 2012

(54) TRAILER ACCESSORY DEVICE

(76) Inventor: David Berkabile, Las Vegas, NV (US)

( * ) Notice: Subject to any disclaimer, the term of this patent is extended or adjusted under 35 U.S.C. 154(b) by 178 days.

(21) Appl. No.: 12/769,576

(22) Filed: Apr. 28, 2010

Related U.S. Application Data

(60) Provisional application No. 61/185,260, filed on Jun. 9, 2009.

(51) Int. Cl.
*B60D 1/36* (2006.01)

(52) U.S. Cl. ............. 280/477; 280/475; 280/478.1; 254/85; 254/420

(58) Field of Classification Search ........... 280/470, 280/477, 478.1, 479.1, 475, 761, 765.1; 254/418–420, 84, 85, DIG. 1
See application file for complete search history.

(56) References Cited

U.S. PATENT DOCUMENTS

| | | | |
|---|---|---|---|
| 178,390 A * | 6/1876 | Taylor | 254/85 |
| 3,084,953 A | 4/1963 | McGregor | |
| 3,178,203 A * | 4/1965 | Elliott | 280/470 |
| 3,740,077 A | 6/1973 | Williams | |
| 3,765,703 A | 10/1973 | Voelkerding et al. | |
| 4,089,426 A * | 5/1978 | Sheppard, Jr. | 414/12 |
| D258,357 S | 2/1981 | Jackson | |
| 4,537,416 A | 8/1985 | Linaburg | |
| 4,911,460 A | 3/1990 | DePaula | |
| 4,961,589 A * | 10/1990 | Faurenhoff | 280/475 |
| 5,009,444 A | 4/1991 | Williams, Jr. | |
| 5,195,769 A | 3/1993 | Williams, Jr. | |
| 5,340,143 A | 8/1994 | Williams, Jr. | |
| 5,690,348 A | 11/1997 | Williams, Jr. | |
| 7,651,114 B2 * | 1/2010 | Weber et al. | 280/477 |

* cited by examiner

*Primary Examiner* — Anne Marie M Boehler

(57) ABSTRACT

A trailer accessory featuring a first half base and a second half base slidably attached to the first half base via a sliding mechanism, the first half base can slide in a first or second direction with respect to the second half base; handles disposed on the top surface of the base near the side edges; a support platform disposed in between handles; wherein when the accessory is used, the accessory is placed under the jack stand of the trailer with the second half base contacting the ground surface, the tongue of the trailer is positioned atop the support platform, a truck is backed up such that the hitch of the truck is in close proximity to the tongue of the trailer, and when the truck is stopped, the first half base can be slid so to align the tongue of the trailer with the hitch.

3 Claims, 8 Drawing Sheets

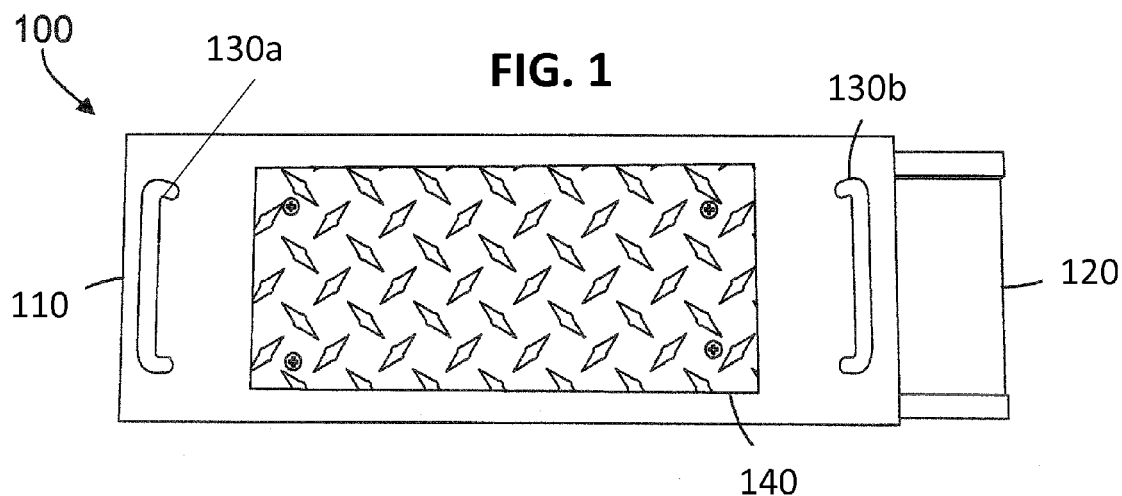
FIG. 1
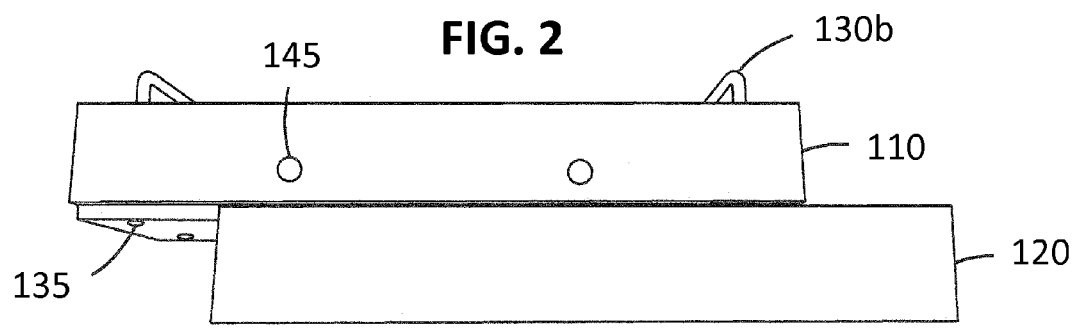
FIG. 2
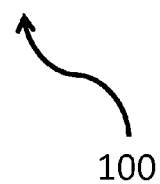

TRAILER ACCESSORY DEVICE

FIELD OF THE INVENTION

The present invention is directed to trailer accessories, more particularly to a trailer accessory that functions to easily attach a trailer to a truck.

BACKGROUND OF THE INVENTION

It can be very difficult and time consuming to hook a trailer to a truck. Oftentimes the task requires more than one person. The present invention features a trailer accessory for helping attach a trailer to a truck. The trailer accessory of the present invention allows the trailer (the tongue of the trailer) to move side-to-side, making it easier to align the trailer with the hitch of the truck (or other vehicle). Thus, it would be less critical to back the truck or other vehicle into an exact position. The accessory of the present invention can be used with most trucks and trailers. The accessory is simple to use.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a top view of an embodiment of the trailer accessory of the present invention.

FIG. 2 is a side perspective view of the trailer accessory of FIG. 1.

DESCRIPTION OF PREFERRED EMBODIMENTS

Figure 3:
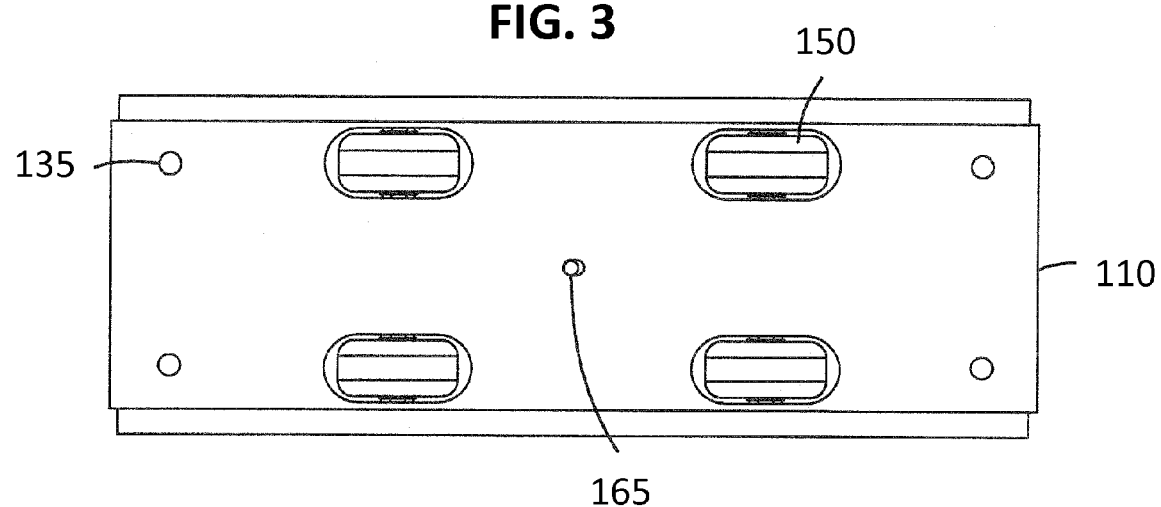
FIG. 3 is a bottom view of the first half base of the trailer accessory of FIG. 1.
Figure 4:
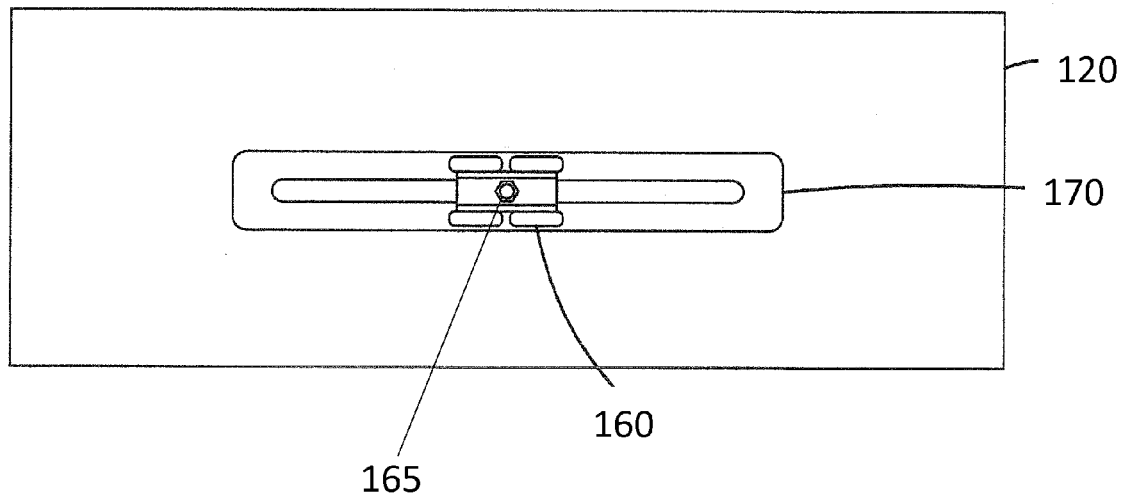
FIG. 4 is a bottom view of the second half base of the trailer accessory of FIG. 1.
Figure 5:
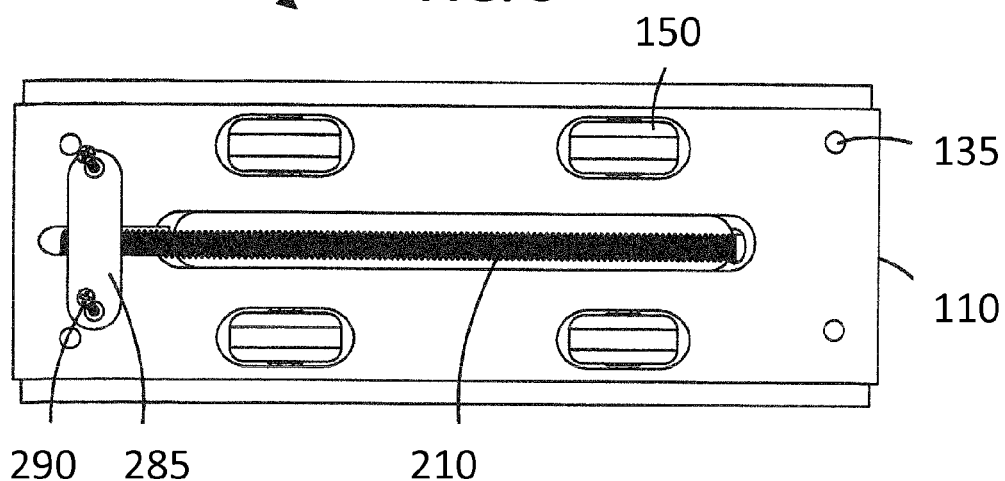
FIG. 5 is a bottom perspective view of a first half base of an alternative embodiment of the trailer accessory of the present invention.
Figure 6:
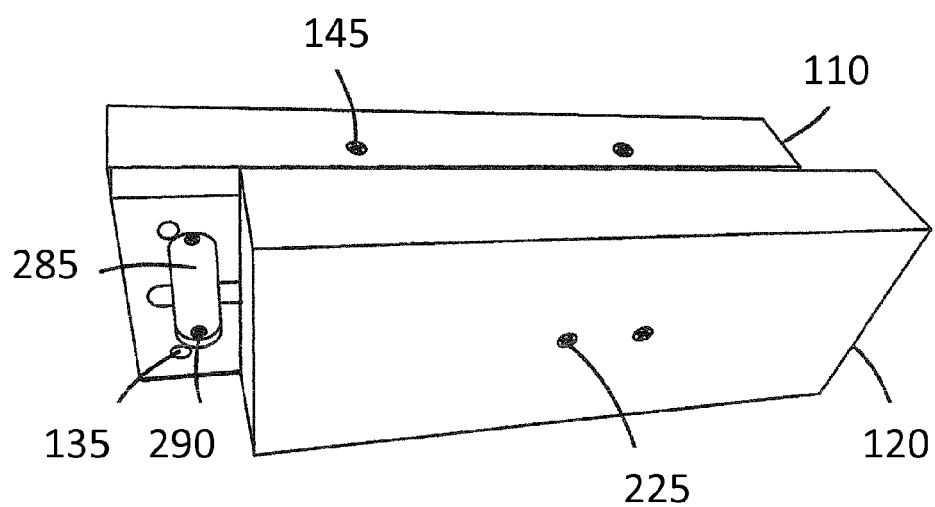
FIG. 6 is a side perspective view of the trailer accessory of FIG. 5.
Figure 7:
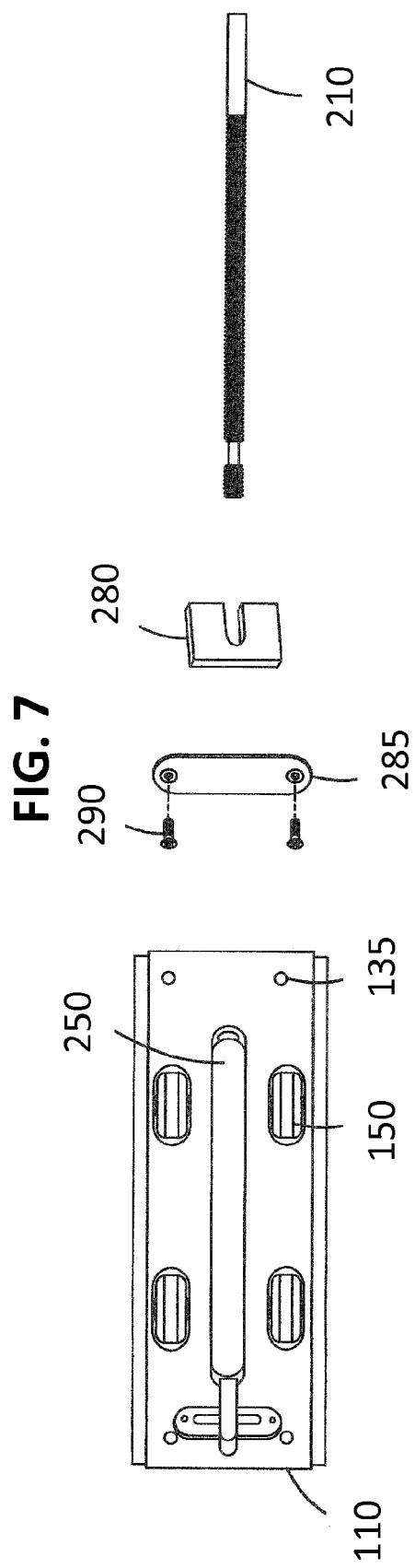
FIG. 7 is an exploded view of the first half base of the trailer accessory of FIG. 5.
Figure 8:
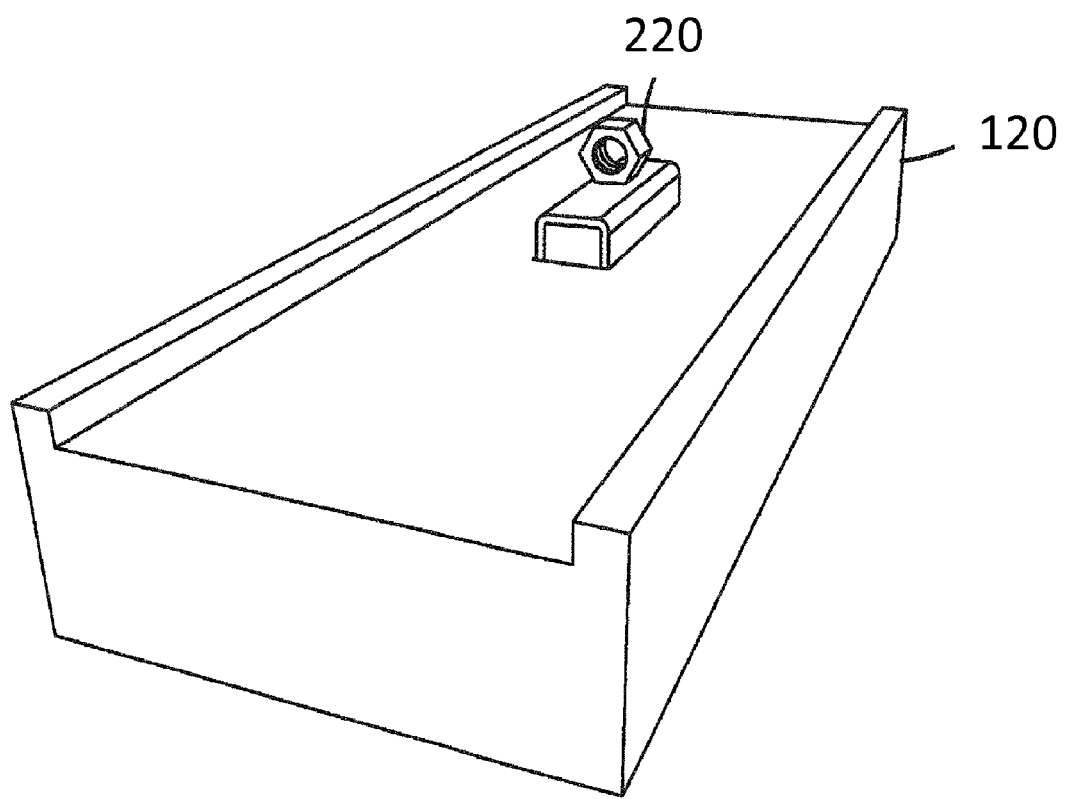
FIG. 8 is a perspective view of the second half base of the trailer accessory of FIG. 5.

Referring now to FIG. 1-11, the present invention features a trailer accessory 100 for helping attach a trailer to a truck. The trailer accessory 100 of the present invention allows the tongue of the trailer to be moved side-to-side, making it easier to align the hitch of the truck (or other vehicle) with the tongue of the trailer and less critical that the hitch of the truck be aligned exactly with the tongue of the trailer when the truck is backed up to the trailer.

The trailer accessory 100 may be constructed in a variety of styles, for example a standard version, a heavy-duty version, a gear-driven version, and/or the like. Referring now to FIG. 1-4, in some embodiments, the trailer accessory 100 comprises a first half base 110 slidably disposed atop a second half base 120 via a sliding mechanism. The first half base 110 can slide in a first direction and second direction with respect to the second half base 120 (e.g., side-to-side). FIG. 1 and FIG. 2 show the first half base 110 moved in the first direction with respect to the second half base 120.

In some embodiments, the sliding mechanism comprises one or more wheels 150 disposed on the bottom surface of the first half base 110, which engage the top surface of the second half base 120. The wheels 150 can rotate about an axle 145, for example an axle spanning from the third side of the top half base 110 to the fourth side of the top half base 110. In some embodiments, the sliding mechanism comprises a track disposed on the top surface of the second half base 120 adapted to engage the bottom surface of the first half base 110 (or a tab disposed on the bottom surface of the first half base 110). The sliding mechanism of the present invention is not limited to the aforementioned examples.

In some embodiments, a center roller component 160 is disposed in the second half base 120, for example in a roller track disposed in the second half base 120. The center roller component 160 can slide in a first direction (e.g., towards the first side of the second half base 120) and a second direction (e.g., towards the second side of the second half base 120) within the roller track. Extending upwardly from the center roller component 160 is an alignment rod 165. The alignment rod 165 extends through a slot disposed in the second half base 120, the slot being aligned with the roller track. The first end of the alignment rod 165 is attached to the center roller component 160 and the second end of the alignment rod is attached to the first half base 110, for example the support platform 140 disposed atop the first half base 110. The alignment rod 165 and center roller component 160 help keep the first half base 110 and second half base 120 attached to each other while allowing the first half base 110 to slide in the first and second directions with respect to the second half base 120.

One or more handles may be disposed on the top surface of the first half base 110. For example, a first handle 130a is disposed on the top surface of the first half base 110 near the first side, and a second handle 130b is disposed on the top surface of the first half base 110 near the second side. The handles 130 may be attached to the first half base 110 via a first attachment means, for example a screw mechanism 135.

Disposed on the top surface of the first half base 110, for example between the first handle 130a and the second handle 130b, is a support platform 140. As shown in FIG, 1, the support platform 140 may be constructed from a material comprising diamond plate.

When the trailer accessory 100 of the present invention is used, the accessory 100 is placed under the jack stand of the trailer (e.g., on a ground surface) with the second half base 120 contacting the ground surface. In some embodiments, the accessory 100 of the present invention may replace a cinder block on which the trailer rests. The tongue of the trailer is positioned atop the support platform 140 (e.g., between the handles 130). A truck can be backed up such that the hitch of the truck is in close proximity to the tongue of the trailer, however the hitch need not be perfectly aligned. When the truck is stopped, a user can slide the first half base 110 with respect to the second half base 120 (via the sliding mechanism) so to align the tongue of the trailer with the hitch.

Referring now to FIG. 5-8, in some embodiments, a drive gear 210 is disposed in the first half base 110 at the bottom surface. In some embodiments, the drive gear 210 is disposed in a drive gear slot 250 disposed in the first half base 110 at the bottom surface. The drive gear 210 is a threaded cylinder adapted to engage a nut 220 disposed atop the top surface of the second half base 120. In some embodiments, the nut 220 is fixedly attached to the second half base 120 via a second attachment means (e.g., a second screw mechanism 225).

In some embodiments, the drive gear 210 is secured in place via a locking pin 280. The locking pin 280 may be secured in place via a locking pin cover plate 285 and plate screws 290.

A user can rotate the drive gear 210 in the nut 220 to move the half base 110 in the first or second direction with respect to the second half base 120. The drive gear 210-based accessory 100 may be particularly useful for trailers with two axles. The gears help hold the first half base 110 in place once it has been moved.

Figure 9:
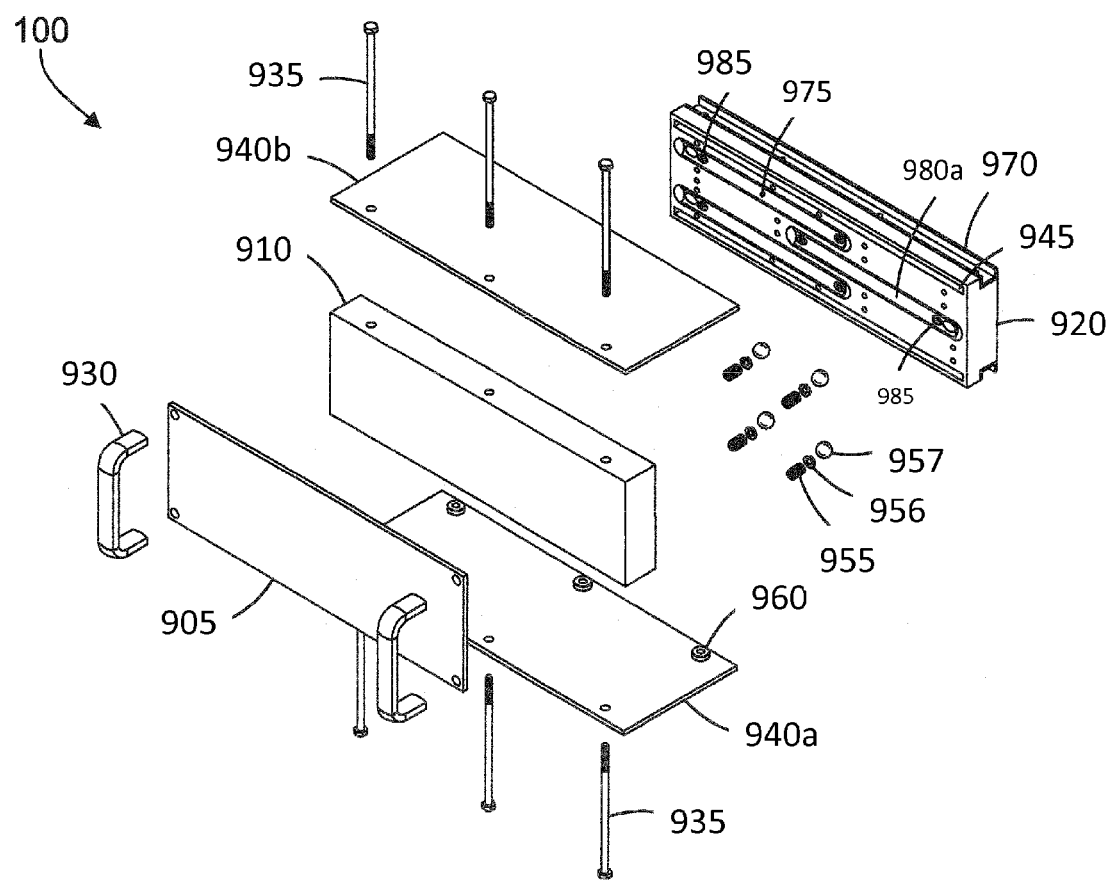
FIG. 9 is a first exploded view of a heavy-duty embodiment of the trailer accessory device of the present invention.
Figure 10:
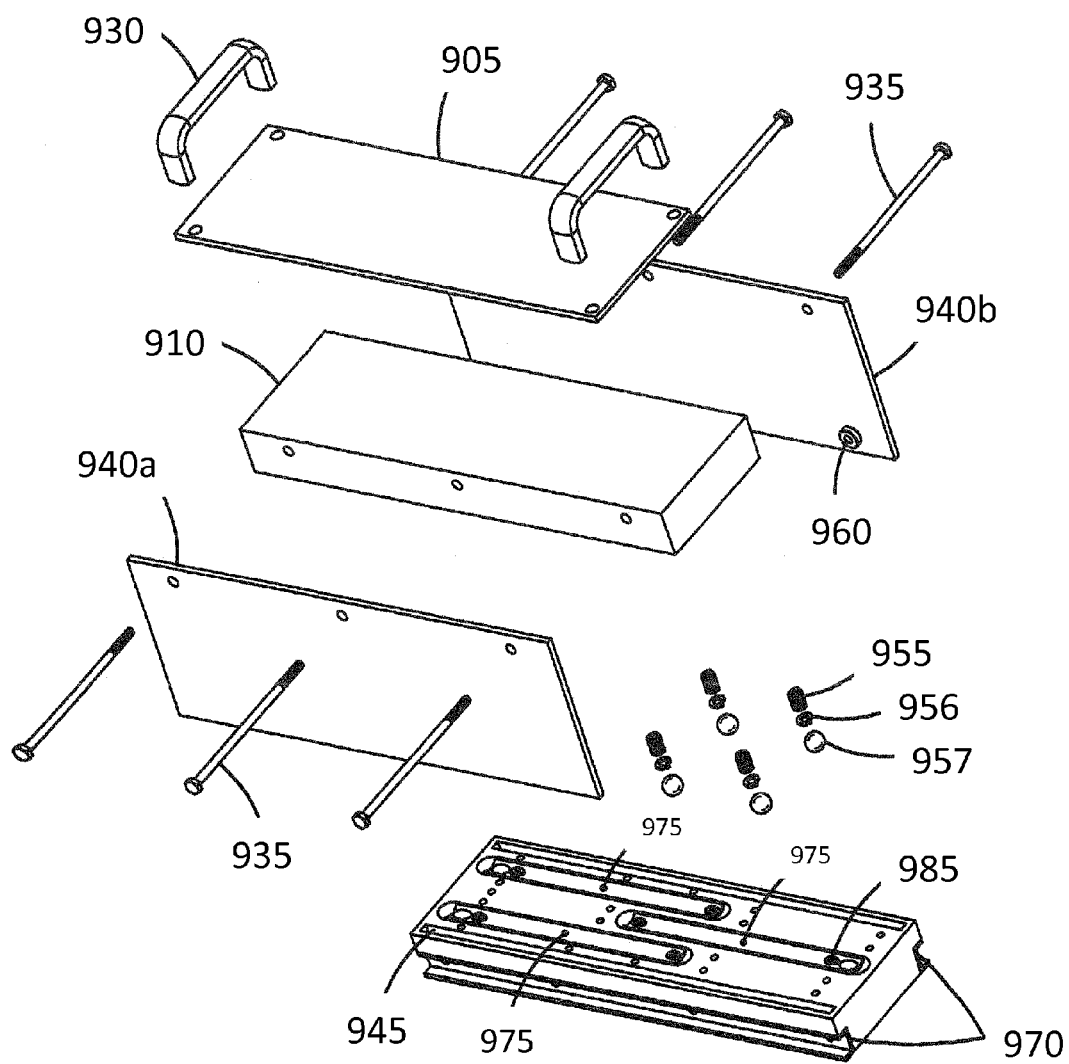
FIG. 10 is a second exploded view of the heavy-duty embodiment of the trailer accessory device of FIG. 9.
Figure 11:
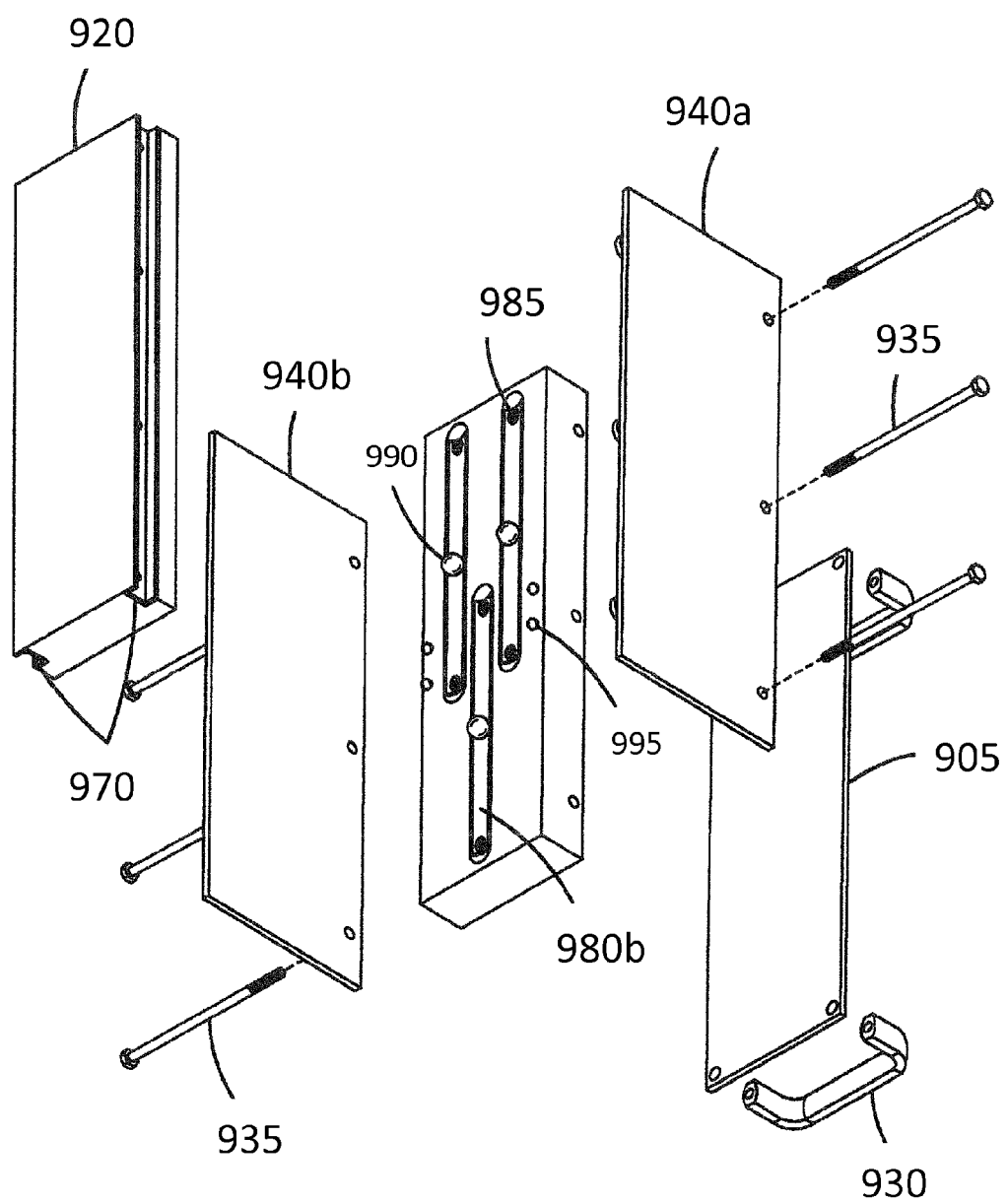
FIG. 11 is a third exploded view of the heavy-duty embodiment of the trailer accessory device of FIG. 9.

Referring now to FIG. 9-11, in some embodiments, the trailer accessory 100 may be constructed in a heavy-duty style. In some embodiments, the trailer accessory 100 comprises a first half base 910 slidably disposed atop a second half base 920 via a sliding mechanism. The first half base 910 can slide in a first direction and second direction with respect to the second half base 920 (e.g., side-to-side). The first half base 910 and the second half base 920 each have a top surface and bottom surface, wherein the bottom surface of the first half base 910 faces the top surface of the second half base 920. A diamond wear plate 905 may be attached to the top surface of the first half base 910, and handles 930 may be attached to the diamond wear plate 905.

As shown in FIG. 9-11, the accessory 100 may further comprise a first side plate 940a and a second side plate 940b, which may be attached to the first half base 910 via an attachment means (e.g., side plate screws 935). Disposed in the side plates 340 (e.g., along the bottom edge) is a plurality of friction alignment bearings 960 (e.g., roller wheels, etc.). The alignment bearings 960 engage a track 970 disposed in the second half base 920 (e.g., the track 970 being in the two side edges of the second half base 920. The alignment bearings 960 and tracks 970 secure the top half base 910 and second half base 920 together and allow the top half base 910 to slide side-to-side with respect to the second half base 920.

As shown in FIG. 9-10, one or more first roller bearing tracks 980a are disposed in the top surface of the second half base 920, for example one near the first side, one near the second side, and one in the middle.

As shown in FIG. 11, one or more second roller bearing track 980b are disposed in the bottom surface of the first half base 910. A main bearing 990 (see FIG. 11) is slidably disposed in each of the roller bearing tracks 980 (e.g., the main bearings 990 slidably connect the first roller bearing tracks 980a to the second roller bearing tracks 980b. Bearing stops 985 may be disposed at the ends of each of the roller bearing tracks 980 to prevent the main bearing 990 from sliding too far or for damaging the ends of the roller bearing tracks 980.

In some embodiments, the accessory 100 comprises a friction spring 955, a bearing cup 956, and a friction bearing 957. The friction spring/bearing may be adapted to be inserted into a hole 995 disposed in the first half base 910. In some embodiments, the accessory 100 comprises one or more center alignment magnets 975.

In some embodiments, a rub plate 945 (for pressuring bearing) is disposed on the top surface of the second half base 920 on the edge near the first side and on the edge near the second side. The rub plate 945 can help the first half base 910 smoothly slide over the second half base 920.

The following the disclosures of the following U.S. Patents are incorporated in their entirety by reference herein: U.S. Pat. No. 4,911,460; U.S. Pat. No. 5,340,143; U.S. Pat. No. 3,740,077; U.S. Pat. No. 3,765,703; U.S. Pat. No. 3,084,953; U.S. Pat. No. 5,690,348; U.S. Pat. No. 5,195,769; U.S. Pat. No. 5,009,444; U.S. Pat. No. 4,537,416.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A trailer accessory for helping attach a trailer to a truck, said trailer accessory comprising:
   (a) a first half base having a top surface and a bottom surface;
   (b) a second half base having a top surface and a bottom surface, the second half base is slidably attached to the first half base;
   (c) a first handle disposed on the top surface of the first half base near a first side and a second handle disposed on the top surface of the first half base near a second side;
   (d) a support platform disposed on the top surface of the first half base in between the first handle and the second handle;
   (e) one or more wheels disposed on the bottom surface of the first half base which engage the top surface of the second half base;
   (f) a roller track disposed in the top surface of the second half base;
   (g) a center roller component slidably disposed in the roller track, the center roller component can slide in a first direction towards a first side of the second half base and a second direction towards a second side of the second half base within the roller track; and
   (h) an alignment rod having a first end and a second end, the first end of the alignment rod is attached to the center roller component and the second end of the alignment rod is attached to the first half base;
   wherein the first half base can be slid a first direction or second direction with respect to the second half base.

2. The trailer accessory of claim 1 further comprising a track disposed on the top surface of the second half base adapted to engage the bottom surface of the first half base.

3. The trailer accessory of claim 1, wherein the second end of the alignment rod is attached to the support platform disposed atop the first half base.

* * * * *